March 3, 1959  R. H. LACART  2,875,777
HERMETIC PORT VALVE ASSEMBLY FOR TAPPING FLUID CONDUITS
Filed Aug. 26, 1955

INVENTOR
ROLLIN H. LACART
BY Roland C. Rehm
ATTORNEY

United States Patent Office 2,875,777
Patented Mar. 3, 1959

2,875,777

HERMETIC PORT VALVE ASSEMBLY FOR TAPPING FLUID CONDUITS

Rollin H. Lacart, Aurora, Ill., assignor to Madden Brass Products Co., Aurora, Ill., a corporation of Illinois Application August 26, 1955, Serial No. 530,662

1 Claim. (Cl. 137—318)

This invention relates to hermetic port valves.

The valve is universal in character so that a single size may be connected with a variety of sizes of line without opening or unsealing the line.

The nature of the invention and further details thereof may be readily understood by reference to one valve embodying the invention and shown in the accompanying drawing.

In said drawing.

Figure 1:
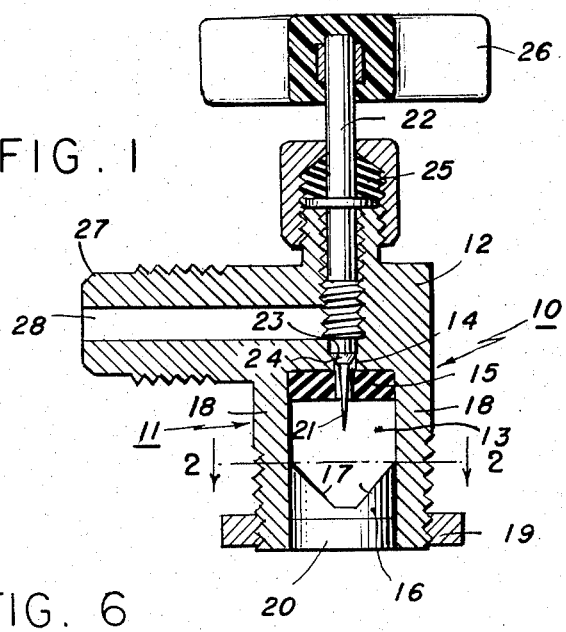
Fig. 1 is a sectional elevation of the valve.
Figure 2:
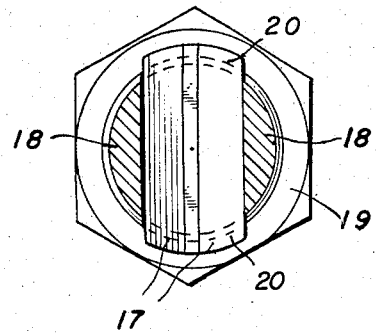
Fig. 2 is a plan section taken on the line 2—2 of Fig. 1.
Figure 6:
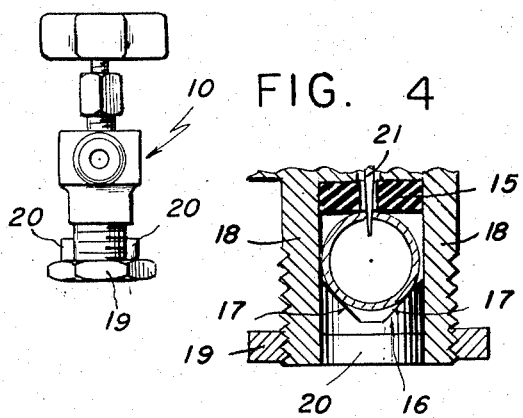
Fig. 6 is an elevation of the valve taken from the left hand of the valve as shown in Fig. 1.

It is often necessary or desirable to insert valves in operating pipe-lines. For example, in gas and oil lines and in refrigerating systems already in use it is often necessary for the service man to cut into the line for coupling gauges, relief valves, etc., therein, and in many cases it is important that this be effected without unsealing the line. In small household refrigerating units, for example, space limitations make the task of connecting a valve in the line very difficult. Lines of this character vary greatly in size with the result that heretofore it has been necessary for the serviceman to carry a large variety of valve sizes and for the manufacturer to make and stock large assortments of valve sizes. The illustrative valve is universal in character fitting a wide range of pipe sizes, and yet it may be easily connected hermetically in the line without unsealing it and at points so limited in space as to make very difficult the coupling of conventional valves by conventional and more expensive methods.

The illustrative valve 10 is characterized by a slotted coupling member 11 projecting from the valve body 12 and adapted to straddle the pipe-line in which the valve is to be coupled. The width of the slot 13 in the coupling member determines the maximum diameter of line to which the valve may be applied. At the base of the slot is the valve port 14, preferably surrounded by a sealing gasket 15 against which a pipe-line is seated and by which the joint between line and valve port is sealed. A follower 16 having a V-shaped bearing face 17 centers the valve on the line and holds the line immovable relative to the valve port. The exterior of the projecting legs 18 comprising the coupling member is cylindrical and threaded to receive a clamping nut 19 adapted when threaded on the coupling member (after the latter has been located on the line) to bear against the projecting ends 20 of the follower and, when drawn tightly, to clamp the line against the gasket 15 and the valve port.

Figure 4:
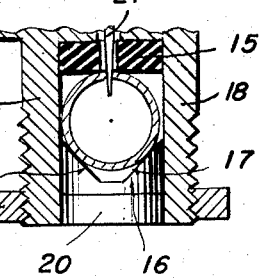
Figs. 4 and 5 are fragmentary views similar to Fig. 1 illustrating the application of the valve to different line sizes.
Figure 3:
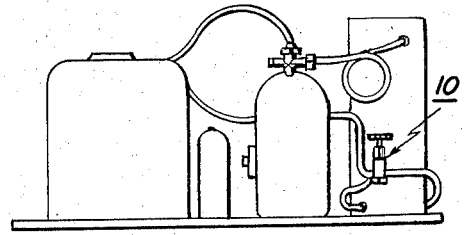
Fig. 3 is a diagrammatic view illustrating the application of the valve in a limited space on a domestic refrigerating unit.
Figure 5:
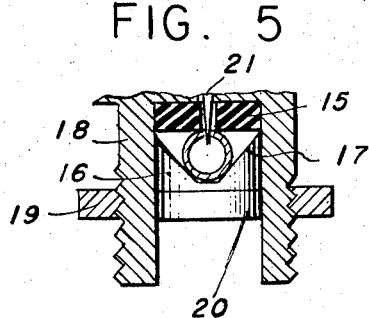

The illustrative valve may be coupled in lines of any size including and smaller than the maximum size (Fig. 4) since the line is always centered by the V-shaped bearing face of the follower and held thereby against the gasket in fixed position relative to the valve port (see Fig. 5). The follower is advantageously made as wide as the slot not only to hold the line against lateral movement but to reinforce the coupling legs 18 which bear against the sides of the follower and are thus held by the nut 19.

After the valve has been thus tightly clamped at the desired point on the line, the latter is appropriately perforated to communicate with the valve port. In the present instance, since lines of this character are generally copper or brass, the perforating tool may simply be pointed as at 21 and, as here shown, is advantageously embodied in the threaded valve stem 22 itself. If the valve stem be brass or the like, the tool point is advantageously hardened steel inserted in the end of the stem (see Fig. 1). To protect the point of the tool when applying the valve to a line, the valve stem is retracted so that the point lies inside the valve body. Then, after the coupling member is straddled on the pipe, the follower 16 is placed in the slot against the line and the nut 19 then threaded tightly on the coupling member to draw the valve and gasket tightly down on the line. The valve stem then is screwed down to cause the tool point (passing through the port and the gasket) to pierce the line and thereby connect the same to port 14. Since the valve and gasket are tightly clamped on the line, the latter remains sealed after being pierced.

Preferably the valve stem is provided with a shoulder 23 at its end to seat against a seat at 24 in the valve body surrounding port 14, so as not to depend on the tapered point of the tool to close the valve port. The valve stem is tightly packed with a conventional packing construction as at 25 and provided with an operating handle 26.

As here shown, the valve body is provided with a threaded terminal coupling 27 provided with a passage 28 communicating with port 14.

In the event the gasket be made of material that shrinks with age, it is desirable to tighten nut 19 periodically or to interpose a spring between nut 19 and follower 16, to maintain sealing pressure on the gasket. Use of soldering or brazing heat to make a tight seal is unnecessary. This is particularly important in cases where application of heat to an operating line would be unsafe.

The illustrative valve may of course be made in various sizes to accommodate widely different ranges of line sizes which are likely to be encountered in different types of apparatus and systems. For example, in refrigerating systems the line sizes generally vary from $3/16$ to $1/2$ of an inch in diameter. For any one range of sizes, a single valve will serve all line sizes within that range, and only one design may be carried and stocked for that range.

Obviously the invention is not limited to the details of the illustrative valve since these may be variously modified. Moreover it is not indispensable that all features of the invention be used conjointly since various features may be used to advantage in different combinations and subcombinations.

Having described my invention, I claim:

A valve adapted for hermetic application to pipe and the like of various diameters comprising in combination a valve body having an outwardly extending hollow cylindrical projection provided with an external thread and being transversely slotted inwardly from its outer end to provide a pair of laterally spaced fingers having less length than the projection and forming in the inner end of the projection a socket of generally cylindrical shape, said valve body having a passageway extending through the base of the socket and provided with a valve seat, an annular gasket seated against the base of the socket with its periphery engaged with the circumferential wall of the socket and having an axial opening aligned with said passageway, a follower slidable in the slot having end margins projecting therefrom and having an inner surface of V-shape in cross section, a nut threaded on the cylindrical projection and engaging the projecting end margins of the follower to move the follower inwardly, and a valve mounted for movement in the passageway engageable with the seat therein and terminating in a pointed end penetrating the axial opening in the gasket and adapted to extend beyond the outer surface thereof.

References Cited in the file of this patent

UNITED STATES PATENTS

| | | |
|---|---|---|
| 2,112,500 | Lemont | Mar. 29, 1938 |
| 2,392,059 | O'Neil | Jan. 1, 1946 |
| 2,432,636 | Van Vleet | Dec. 16, 1947 |
| 2,608,989 | McDonald | Sept. 2, 1952 |

FOREIGN PATENTS

| | | |
|---|---|---|
| 162,366 | Great Britain | Apr. 25, 1921 |
| 505,046 | Great Britain | May 4, 1939 |